United States Patent
Jansen et al.

(10) Patent No.: US 7,962,077 B2
(45) Date of Patent: Jun. 14, 2011

(54) DEVELOPING ROLLER, DEVELOPING APPARATUS COMPRISING THE DEVELOPING ROLLER, AND METHOD FOR PROVIDING THE DEVELOPING ROLLER

(75) Inventors: John Jansen, Beek (NL); Tsuyoshi Tokiwa, Beek (NL); Eiji Sawa, Beek (NL)

(73) Assignee: Ten Cate Enbi International B.V., Beek (NL)

( * ) Notice: Subject to any disclaimer, the term of this patent is extended or adjusted under 35 U.S.C. 154(b) by 169 days.

(21) Appl. No.: 12/422,888

(22) Filed: Apr. 13, 2009

(65) Prior Publication Data

US 2009/0257789 A1 Oct. 15, 2009

(30) Foreign Application Priority Data

Apr. 15, 2008 (EP) .................................. 08075296

(51) Int. Cl.
*G03G 15/08* (2006.01)
(52) U.S. Cl. .................... 399/286; 399/265; 399/279
(58) Field of Classification Search .................. 399/265, 399/279, 286; 427/146
See application file for complete search history.

(56) References Cited

U.S. PATENT DOCUMENTS

| 6,108,509 A | 8/2000 | Okada et al. | |
| 6,714,754 B2 | 3/2004 | Ozeki et al. | |
| 2005/0127333 A1* | 6/2005 | Onuki et al. | 252/500 |
| 2006/0159494 A1* | 7/2006 | Hirai et al. | 399/303 |
| 2008/0226356 A1* | 9/2008 | Yasunaga et al. | 399/279 |

FOREIGN PATENT DOCUMENTS

| EP | 1 069 482 | 1/2001 |
| EP | 1079280 | 2/2001 |
| JP | 10239985 | 9/1998 |
| JP | 2002214882 | 7/2002 |

OTHER PUBLICATIONS

European Search Report for EP application No. 08075296.7 in the name of Ten Cate Enbi international B.V.
European Search Report for EP application 08020427.4 in the name of Ten Cate Enbi International B.V. filed on Nov. 25, 2008.

* cited by examiner

*Primary Examiner* — Ryan D Walsh
(74) *Attorney, Agent, or Firm* — Steinfl & Bruno LLP

(57) ABSTRACT

Developing roller comprising a conductive mandrel with at least an elastic conductive base layer and a charge providing layer. The base layer is located closer to the mandrel than the charge providing layer. The base layer is roughened before the charge providing layer is applied to the base layer.

9 Claims, 3 Drawing Sheets

DEVELOPING ROLLER, DEVELOPING APPARATUS COMPRISING THE DEVELOPING ROLLER, AND METHOD FOR PROVIDING THE DEVELOPING ROLLER

CROSS REFERENCE TO RELATED APPLICATIONS

This application claims priority to European Patent Application EP 08075296.7 filed on Apr. 15, 2008, the contents of which are incorporated herein by reference in their entirety. This application is also related to U.S. application Ser. No. 12/424,413 filed on Apr. 15, 2009.

FIELD

The present disclosure relates to a developing roller comprising a conductive mandrel with at least an elastic conductive base layer and a charge providing layer, whereby the base layer is located closer to the mandrel than the charge providing layer.

The present disclosure also relates to a developing apparatus comprising such a developing roller as well as a method for providing such a developing roller.

BACKGROUND

Developing rollers, known, for example, from U.S. Pat. No. 6,714,754 B2, are used in an image forming apparatus for developing an electrostatic latent image on a surface of an image bearing member by use of a non magnetic toner to form a toner image. To obtain good images, the requirements of the developing roller are relatively high, especially with respect to the conductivity, hardness, uniformess of the surface etcetera. Furthermore, it is important that the charge providing layer has a good connection to the base layer to prevent local separation or peeling off of the charge providing layer due to the friction between the charge providing layer and the parts of the non magnetic toner.

By the developing roller according to the above mentioned patent, an elastic intermediate layer is provided between the charge providing layer and the base layer.

However, this has the disadvantage that an additional layer needs to be formed on the developing roller. Such an elastic intermediate layer often comprises a solvent to have a good adherence. Such solvent is not good for the environment. Furthermore, the electrical conductivity of such an elastic layer is relatively poor.

SUMMARY

According to a first aspect, a developing roller comprising a conductive mandrel with at least an elastic conductive base layer and a charge providing layer is provided, wherein the base layer is located closer to the mandrel than the charge providing layer, and wherein the base layer is roughened before the charge providing layer is applied to the base layer.

According to a second aspect, a method for providing a developing roller comprising a conductive mandrel with at least an elastic conductive base layer and a charge providing layer is provided, comprising: locating the base layer closer to the mandrel than the charge providing layer, roughening the base layer and, after that, applying the charge providing layer to the base layer.

Further aspects of the present disclosure can be found in the specification, drawings and claims of the present application.

In the present disclosure, a developing roller is provided whereby a good connection between the charge providing layer and the base layer is obtained.

This is achieved by roughening the base layer before the charge providing layer is supplied through the base layer.

By roughening the surface of the base layer, a good connection is obtained between the base layer and the charge providing layer without the necessity of an elastic intermediate layer.

Preferably, the surface of the base layer is being roughened by blasting. Although the surface of the base layer can also be roughened by grinding, blasting is being preferred because it can create finer and more uniform surface structure than grinding. Furthermore, by blasting, a more uniform roughness over the whole surface is obtained than by grinding. A uniform surface is advantageous for obtaining a uniform charge providing layer and has a good toner transfer property and print quality.

An embodiment of the developing roller according to the present disclosure is characterized in that, before the charge providing layer is applied to the base layer, the base layer has a surface roughness Ra of $0.1<Ra<3$.

With such a surface roughness a good connection between the base layer and the charge providing layer is obtained and also a good printing quality can be realized.

A further embodiment of the developing roller according to the present disclosure is characterized in that the ratio between the surface roughness of the base layer in axial direction and radial direction of the developing roller is $0.5<Ra$ (axial direction)/$Ra$ (radial direction)$<2$.

With such a ratio a good uniformity over the total surface of the developing roller is obtained resulting in a good printing quality.

BRIEF DESCRIPTION OF THE DRAWINGS

The present disclosure will now be explained with reference to the drawings in which.

DETAILED DESCRIPTION

Figure 1:
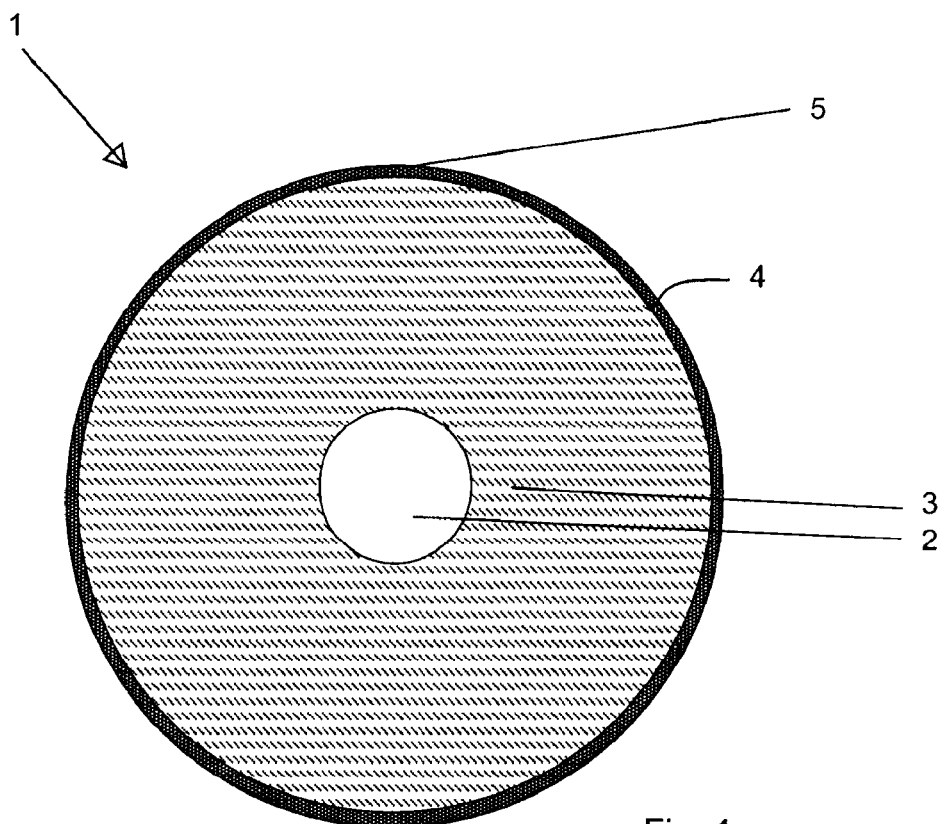
FIG. 1 is a cross section of a first embodiment of a developing roller according to the present disclosure.

FIG. 1 shows a developing roller 1 according to the present disclosure, which comprises a conductive mandrel 2 with a diameter in the range of, e.g., 6 mm to 20 mm. On mandrel 2, a base layer 3 of, for example, 4 mm is provided. Base layer 3 is made, for example, of silicone rubber containing conductive adhesives to control the electric resistivity. The silicone material can be Shinetsu KE1379AB. With this silicone material, the hardness of the base layer is desirably less than 65 Asker C. The outer surface 4 of the base layer 3 is roughened or abraded by blasting. The blasting media material can be silica glass, ceramic, metal or plastic.

In this embodiment, plastic media IEPCO MS400BT has been used. The size of the blasting media will be desirably less than 500 μm. When blasted, the blasting media is jetted out of the nozzle by air pressure in the blasting chamber. By this blasting method, the surface 4 is roughened, whereby the surface roughness Ra is controlled to be between 0.1 and 3.0 μm.

Roughness may be measured using contact or non-contact methods. Contact methods involve dragging a measurement stylus across the surface; these instruments include profilometers. Non-contact methods include interferometry, confocal microscopy, electrical capacitance, laser microscope and electron microscopy. The surface roughness is determined amongst others by the air pressure of blasting, the distance between blasting nozzle head and the surface, the hardness of the rubber surface and the nozzle transfers speed.

Figure 3:
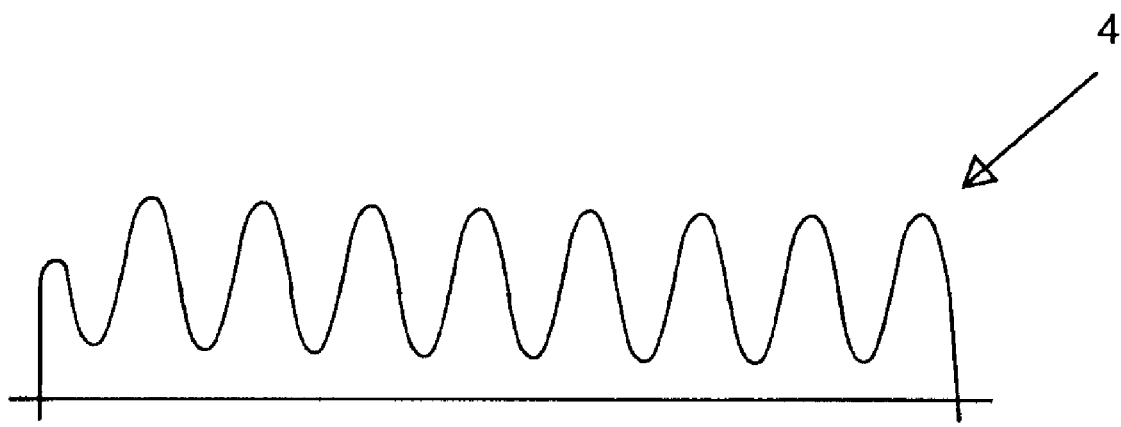
FIG. 3 shows on a large scale a blasted surface.

Due to the roughened surface, the surface energy is lowered down so that the charge providing layer 5 can easily can be adhered thereon. By blasting a finer and more uniform surface structure can be obtained (see FIG. 3) than by grinding (see FIG. 4). The ratio of the surface roughness in Ra axial direction and Ra radial direction on the base layer needs to be 0.5<Ra(axial direction)/Ra(radial direction)<2 to obtain a relatively uniform roughened surface in order to obtain uniform print pictures.

The charge providing layer 5 comprises elastic polymers, wherein polyurethane and conductive adhesives are mixed. Table 1 shows one example of a mixture for a charge providing layer 5.

TABLE 1

| constituent | Additive amount [%] |
|---|---|
| Baytron P | 31.5 |
| Ammonia 5% | 1.6 |
| ABU610 | 65.5 |
| Rohagit SD15 | 0.7 |
| BYK-333 | 0.1 |
| BYK-348 | 0.6 |

Baytron P: H. C. Starck GmbH, ZB-PT Stab PSI, Postfach 2540, 38615 Goslar Germany
ABU610: Alberdingk, Deusseldorfer Str. 53, 47829 Krefeld, Germany
Rohagit SD15: PolynerLatex GmbH, D-45764, Marl, Germany
BYK-333, BYK-348, Chemie GmbH, Abelstr. 14, D-46483 Wesel, Germany The volume sensitivity of the charge providing layer can be from $1 \times 10^2$ ohm cm to $1 \times 10^7$ ohm cm. In this embodiment, the sensitivity was $5 \times 10^6$ ohm cm.

Because the charge providing layer 5 is directly applied to the base layer 3, the ohmic contact is much better than in a case when there is an intermediate layer between the base layer 3 and the charge providing layer 5.

Figure 2:
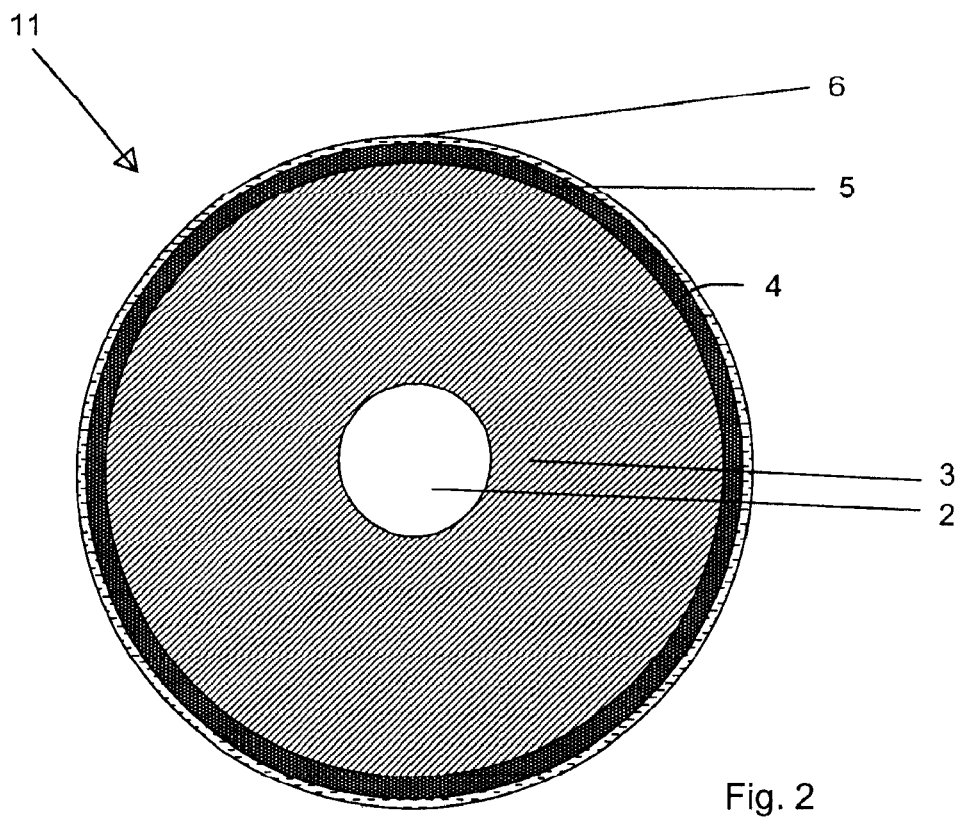
FIG. 2 is a cross section of a second embodiment of a developing roller according to the present disclosure.

FIG. 2 shows a second embodiment of a developing roller 11 according to the present disclosure which differs from the developing roller 1 in that on the charge providing layer 5 a top layer 6 is applied. The top layer 6 comprises elastic polymers, wherein resin (Struktol VP5307) and latex (Rohagit SD15) are mixed.

Table 2 shows one example of the mixture of this top layer 6.

TABLE 2

| constituent | Additive amount [%] |
|---|---|
| Struktol VP5307 | 96.0 |
| Ammonia 5% | 0.5 |
| Rohagit SD15 | 3.0 |
| BYK-348 | 0.5 |

Figure 4:
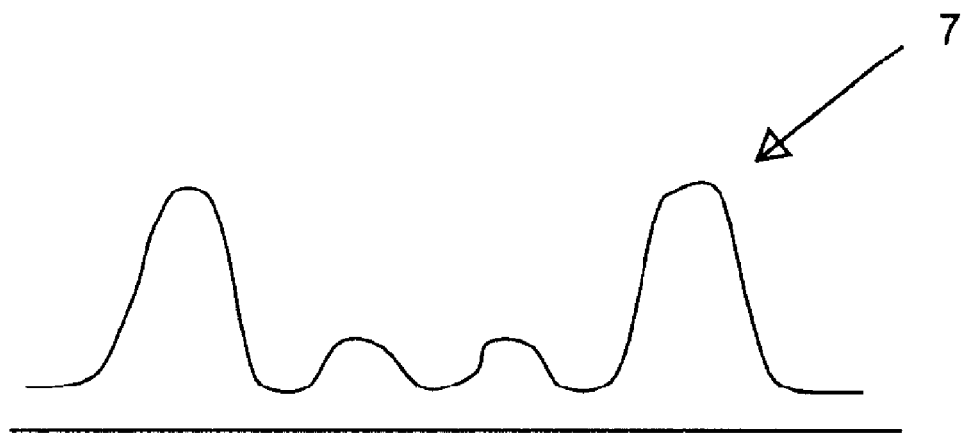
FIG. 4 shows on a large scale a grinded surface.

Struktol VP5307: Schill-Seilacher Chemosch Spezialitaten, Moorfleer Str. 28, 22113 Hamburg, Germany Table 3 shows the correlation between the surface roughness ratio and the print quality. Samples I-IV were blasted and sample V was ground sample with wet grinding. With wet grinding, a surface 7 as shown in FIG. 4 will be obtained. As can be seen in table 3, the bonding quality between the base layer 3 and the charge providing layer was good on samples I-IV because of the blasting method, while the bonding and uniformity was not good on sample V. As a result, the print quality on the sample V was also not acceptable.

TABLE 3

| | Sample No | | | | |
|---|---|---|---|---|---|
| | I | II | III | IV | V |
| Abrasion method | Blasting | Blasting | Blasting | Blasting | Wet grinding |
| Roughness (Ra) on base layer [μm]: BR base layer roughness | | | | | |
| Axial direction (BRax) [μm] | 0.21 | 0.51 | 1.5 | 2.46 | 1.1 |
| Radial direction (BRra) [μm] | 0.25 | 0.64 | 1.62 | 2.61 | 2.5 |
| Ratio BRra/BRax | 1.190 | 1.255 | 1.080 | 1.061 | 2.273 |
| Charge providing layer | Yes | Yes | Yes | Yes | Yes |
| Roughness (Ra) on top layer [μm]: SR = surface layer roughness | | | | | |
| Axial direction (SRax) [μm] | 0.21 | 0.87 | 0.87 | 1.83 | 1.89 |
| Radial direction (SRa) [μm] | 0.32 | 0.89 | 0.89 | 2.56 | 0.91 |
| Ratio Sra/SRax | 1.524 | 1.023 | 1.023 | 1.399 | 0.481 |
| Bonding quality | Good | Good | Good | Good | Bad |
| Print Quality | Good | Good | Good | Good | Bad uniformity |

Figure 5:
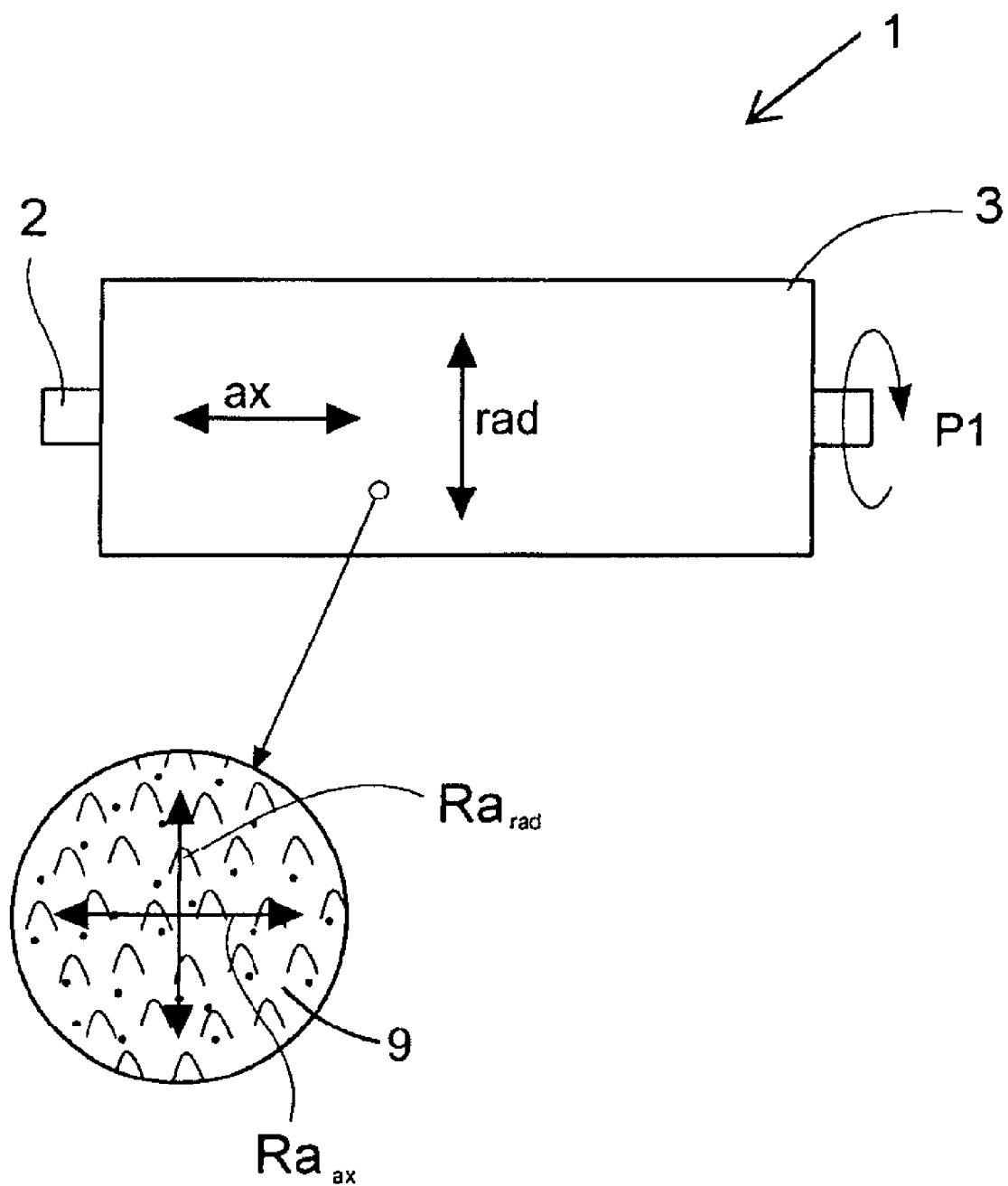
FIG. 5 shows in a schematic view a roller with only a base layer and an enlargement of the surface relief of the base layer of the roller.

FIG. 5 shows part of a conductive roller 1 according to the present disclosure which comprises a conductive mandrel 2, which can be rotated in or opposite to the direction indicated with P1 and a base layer 3 provided on the mandrel 2. Further, the axial direction of the surface 9 of the base layer 3 has been indicated with ax and the radial direction following the surface 9 of the base layer 3 has been indicated with rad.

For obtaining a preferred surface roughness uniformity of the surface 9 of the base layer 3, the ratio between the surface roughness of the base layer in axial direction (ax) and radial direction (rad) of the developing roller is 0.5<Ra (axial direction)/Ra (radial direction)<2. With such ratio, a uniform surface 9 has been obtained for providing a good connection between the base layer 3 and the charge providing layer 4. A uniform surface 9 is needed for obtaining good toner transfer properties and print quality with said uniform charge providing layer 4.

Accordingly, what has been shown are a developing roller, a developing apparatus comprising the developing roller, and a method for providing the developing roller. While such roller, apparatus and method have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

The invention claimed is:
1. A developing roller comprising:
a conductive mandrel with at least an elastic conductive base layer and a charge providing layer, wherein:

the base layer is located closer to the mandrel than the charge providing layer;

the base layer is roughened by blasting before the charge providing layer is applied to the base layer;

before the charge providing layer is applied to the base layer, the base layer has a surface roughness Ra of 0.1 <Ra <3; and a ratio between the surface roughness of the base layer in axial direction and radial direction of the developing roller is 0.5 <Ra (axial direction)/Ra (radial direction) <2.

2. The developing roller according to claim 1, wherein the charge providing layer is applied directly to the roughened base layer.

3. The developing roller according to claim 1, wherein a top layer is applied to the charge providing layer.

4. The developing roller according to claim 1, wherein the base layer comprises rubber.

5. The developing roller according to claim 4, wherein the rubber is silicone rubber.

6. A developing apparatus comprising:

a toner container for containing therein a non magnetic toner for developing an electrostatic latent image formed on a surface of an image bearing member, and the developing roller according to claim 1 for transporting the non magnetic toner from said toner container, while causing the toner to adhere to the surface of the developing roller.

7. A method for providing a developing roller comprising a conductive mandrel with at least an elastic conductive base layer and a charge providing layer, comprising:

locating the base layer closer to the mandrel than the charge providing layer, roughening the base layer by blasting and, after that, applying the charge providing layer to the base layer, wherein before the charge providing layer is applied to the base layer, the base layer has a surface roughness Ra of 0.1 <Ra <3 and wherein a ratio between the surface roughness of the base layer in axial direction and radial direction of the developing roller is 0.5 <Ra (axial direction)/Ra (radial direction) <2.

8. The method according to claim 7, wherein the charge providing layer is applied directly to the roughened base layer.

9. The method according to claim 7, wherein a top layer is applied to the charge providing layer.

* * * * *